(12) United States Patent
Zhan

(10) Patent No.: US 9,396,390 B2
(45) Date of Patent: Jul. 19, 2016

(54) SYSTEMS AND METHODS FOR SKETCH PROCESSING

(71) Applicant: Pei Zhan, Ada, MI (US)

(72) Inventor: Pei Zhan, Ada, MI (US)

(73) Assignee: Pei Zhan, Ada, MI (US)

( * ) Notice: Subject to any disclaimer, the term of this patent is extended or adjusted under 35 U.S.C. 154(b) by 230 days.

(21) Appl. No.: 14/021,487

(22) Filed: Sep. 9, 2013

(65) Prior Publication Data
US 2014/0253558 A1   Sep. 11, 2014

Related U.S. Application Data

(60) Provisional application No. 61/775,210, filed on Mar. 8, 2013.

(51) Int. Cl.
*G06T 11/00* (2006.01)
*G06K 9/00* (2006.01)

(52) U.S. Cl.
CPC ........ *G06K 9/00476* (2013.01); *G06K 9/00416* (2013.01)

(58) Field of Classification Search
CPC ..................................................... G06T 11/203
See application file for complete search history.

(56) References Cited

U.S. PATENT DOCUMENTS

| | | | | |
|---|---|---|---|---|
| 6,233,351 B1 * | 5/2001 | Feeney | ............... | G06K 9/00416 345/522 |
| 7,515,752 B2 * | 4/2009 | Tremblay | ........... | G06K 9/00402 382/182 |
| 9,098,191 B2 * | 8/2015 | Gulwani | ............. | G06F 3/04883 |
| 2004/0037463 A1 * | 2/2004 | Calhoun | ................ | G06K 9/222 382/186 |
| 2006/0227140 A1 * | 10/2006 | Ramani | .............. | G06K 9/00416 345/441 |
| 2011/0010683 A1 * | 1/2011 | Potts | ................... | G06F 17/5077 716/126 |

OTHER PUBLICATIONS

Sezgin et al., Sketch Based Interfaces: Early Processing for Sketch Understanding, ACM SIGGRAPH 2006, Jul. 30, 2006, pp. 1-8.*

* cited by examiner

*Primary Examiner* — M Good Johnson
(74) *Attorney, Agent, or Firm* — Sterne, Kessler, Goldstein & Fox P.L.L.C.

(57) ABSTRACT

A system, computer-readable storage medium storing at least one program, and a computer-implemented method for processing user stroke data are presented. To begin, a first series of data points obtained from a sketch input module may be detected. A recognition result corresponding to a matching geometry is then generated and displayed through a user interface. The recognition result comprises a recognized geometry and an assisting geometry. A second series of data points obtained from the sketch input module is then detected. Responsive to detecting that the second series of data points is within a conformity threshold relative to the assisting geometry, the recognized geometry is updated by extending the boundary of the recognized geometry to additionally correspond with the second series of data points. The recognition result with the updated recognized geometry is then displayed through the user interface.

24 Claims, 12 Drawing Sheets

At time $T_0$

At time $T_1$

Initially both recognized geometry and assisting geometry are horizontal

After recognized geometry being rotated, the angle of assisting geometry is updated too to stay synchronized State 1: User sketch data deviates from the
assisting geometry (circle)

State 2: Two assisting geometries are created:
ellipse and circle

State 3: The ellipse assisting geometry is chosen.
An elliptical arc is generated to replace the existing
recognized geometry of the stroke segment.

State 1

State 2

The circle assisting geometry is chosen to generate an arc as the recognized geometry

SYSTEMS AND METHODS FOR SKETCH PROCESSING

CROSS REFERENCE TO RELATED APPLICATIONS

This application claims priority from U.S. Provisional Appl. No. 61/775,210, filed Mar. 8, 2013, entitled "METHODS AND SYSTEMS FOR SKETCH INPUT," all of which is incorporated herein by reference in its entirety for all purposes

TECHNICAL FIELD

This application relates to data processing. In particular, example embodiments may relate to systems and methods of processing sketch input.

BACKGROUND

Many traditional computer applications allow users to define a geometric shape or figure (simply referred to herein as a geometry). The terms "geometry shape" or simply "geometry," as used herein, may refer to one or more properties defining a shape. Such properties may include, for example, a length, angle, position, points, radii, center, and any other suitable property usable to specify a geometric relationship. In some cases, a geometry may be composite or complex geometry that is composed of multiple sub-geometries. For example, a complex geometry may be comprised of various points, lines, curves, and the like.

Many traditional computer applications provide drawing tools for users to define geometries. In general, these drawing tools may be specifically configured to produce a certain type of geometry, and may be especially useful for input devices such as keyboards and mouse. For example, a "line" drawing tool may be configured to create line geometries, while an "arc" drawing tool may be configured to create arc geometries. Since there is possibly more than one method to define many types of geometries, each specific tool may have multiple options for defining a given type of geometry. For example, an "arc" tool can define an arc geometry by either using three different points, or, alternatively, by using a center, radius, start angle and end angle. As a result, two options could be available in the "arc" tool for users to choose. Furthermore, for composite shapes comprising of multiple sub-geometries, multiple tools may be needed to define each comprising sub-geometry. This all requires users to learn each of the related drawing tools and the corresponding options used to define the various types of geometries. Further, because users may need to switch between different tools/options for a composite geometry, many iterative inputs may be necessary.

In comparison to drawing tool-based methods for generating types of geometries, a free-hand drawing application may operate without use of any specific drawing tool. Instead, free-hand drawing applications simply process sketch input received on devices such as touchscreen and interprets it as graphics. Since it is very similar to the drawing process of using pen and paper, free-hand drawing applications are considered to be natural, intuitive and easy to use. However, the sketch input from a free-hand drawing application, without further processing, is typically in rough form that lacks certain geometric information and precision (e.g., a line may not be straight, for example).

In some cases, traditional free-hand drawing applications may attempt to "beautify" the sketch input by matching rough sketches to predefined geometric shapes, which are then used to replace the rough sketches. To illustrate, such traditional free-hand drawing applications may interpret the rough sketches by performing a series of processes on the input stroke, such as, for example, calculating direction, speed and curvature to segment a rough sketch. Each segment from the rough sketch is then tested to match a primitive shape that best fits the segment.

United States Patent Publication 2006/0227140, by Jiantao Pu et al., entitled "Sketch Beautification," discloses a technique for providing different ways of beautifying sketches by segmenting sketch data and then performing primitive recognition. A circle-scanning strategy is used to segment a stroke into independent primitives. For geometric primitive recognition, a shape histogram method is used, which includes a sampling process, and a process of building corresponding distance histogram, a normalization process and, finally, computing similarity between two histograms.

United States Patent Publication 2006/0045343, by Christopher Tremblay, entitled "Sketch Recognition and Enhancement," discloses a technique for recognizing sketch input based on stroke data and its time associated information. In this reference, complex shapes can be grouped and recognized based on time proximity. During the recognition process, first a stroke comparator will be used to compare to, and recognize as, a known shape. If a stroke does not match a known shape, a generic low level recognition process is used to find the high curvature point for segmentation, and further recognize each segment as a line or curve.

Generally, a sketch recognition process can be delayed or real-time. For a delayed recognition process, it only starts after users finish the sketch input. Once misrecognition happens, it will be difficult to adjust the results and the wrong result could even propagate.

Recent advancements have adopted real-time incremental recognition. For example, a paper by J Arvo et al., entitled "Fluid sketches: continuous recognition and morphing of simple hand-drawn shapes," In Proceedings of UIST '00 Proceedings of the 13th annual ACM symposium on User interface software and technology, 2000. New York, N.Y., USA: ACM Press ("Fluid Sketches"), suggests the concept of "fluid sketching." At determinable time intervals, the fluid sketching concept evaluates the input stroke to geometric shapes (such as circle, box etc.), to find the best fit to the input stroke, and provide instant feedback of sketch recognition. However, the fluid sketching concept contemplated by paper Fluid Sketches may fail to provide proper feedback for a user trying to draw a geometric shape not previously defined by the system.

A paper by J. Li et al., entitled "Sketch recognition with continuous feedback based on incremental intention extraction," In Proceedings of the 10th International Conference on Intelligent User Interfaces, 2005, San Diego, Calif., USA, ACM Press ("Sketch Recognition with Continuous Feedback"), introduces a method of sketch recognition with continuous feedback based on incremental intention extraction. The method introduced by Sketch Recognition with Continuous Feedback recognizes a continuous stroke input based on its sections: during the continuous input, every a fixed number of input points are collected into a section. Whenever recent input points are accumulated to form a new section, the algorithm discussed in Sketch Recognition with Continuous Feedback tries to identify a geometry as the intention of the section. In some cases, the methods described in Sketch Recognition with Continuous Feedback may update existing sections by determining if the current section can be combined with its previous section or not. For example, if both sections are line sections and the two lines are collinear, the two sections can be combined. Thus, the method of Sketch Recognition with Continuous Feedback operates by collecting a determinable number of sketch point data (e.g., a section) and then matching the collected sketch point data with a geometry.

BRIEF DESCRIPTION OF THE DRAWINGS

The present invention is illustrated by way of example, and not by way of limitation, in the figures of the accompanying drawings in which.

DETAILED DESCRIPTION

Figure 1:
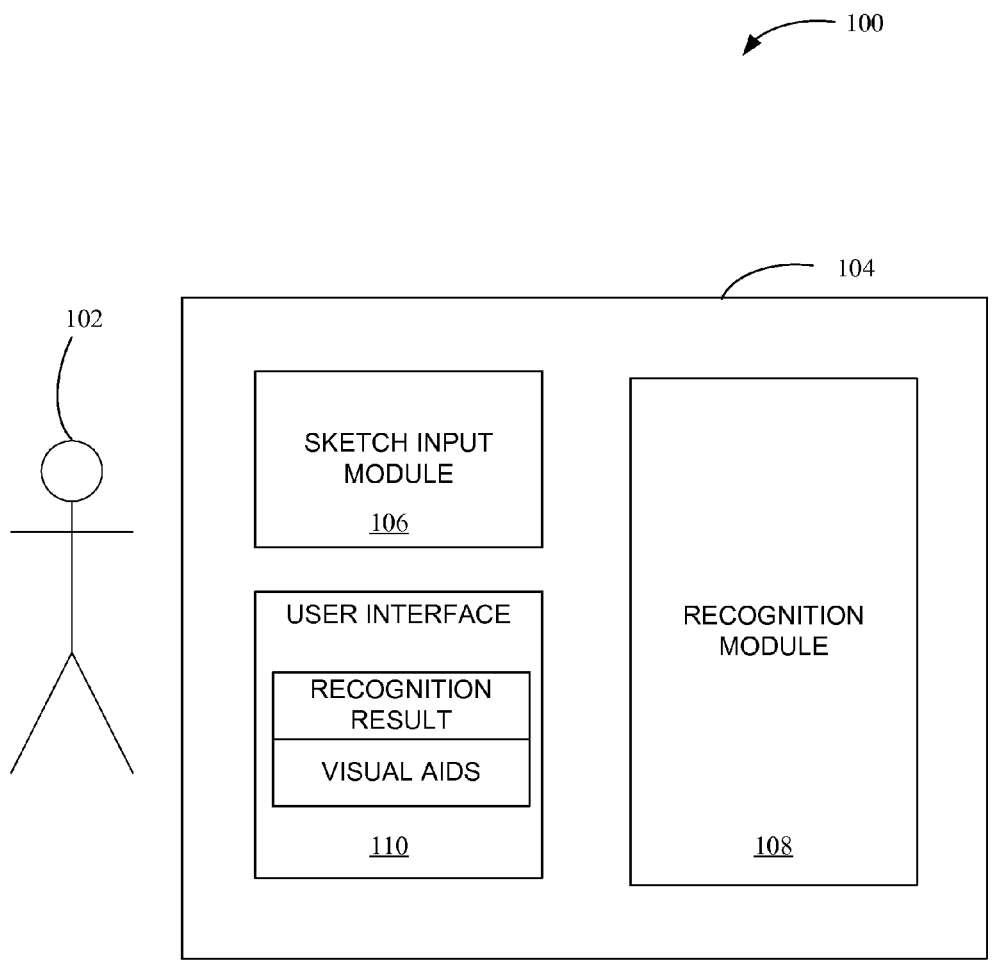
FIG. 1 is a block diagram showing components in a system where a user interacts with a client device configured to process user stroke data, according to an example embodiment.

Although example embodiments have been described with reference to specific examples, it is to be appreciated that various modifications and changes may be made to these embodiments without departing from the broader spirit and scope of the invention. Accordingly, the specification and drawings are to be regarded in an illustrative rather than a restrictive sense.

Example embodiments may relate to systems and methods of data processing of stroke input. More particularly, consistent with example embodiments described herein, a system or a method may create comparatively precise and aesthetic geometric shapes by processing input data obtained from a stroke input device.

For example, an embodiment may detect a first series of data points obtained from a stroke input device, where the first series of data points may represent user stroke data. The example embodiment may then match the first series of data points with a geometry (e.g., a line geometry, an arc geometry, or the like). A recognition result corresponding to the matching geometry may then be generated. The recognition result may comprise a recognized geometry and an assisting geometry. The recognized geometry may have a boundary corresponding to the first series of data points, and the assisting geometry may be a geometric extension of the recognized geometry. The recognition result may be displayed through the user interface.

After the recognition result is displayed, a second series of data points may be detected by example embodiments. In some cases, the second series of data points represents a continuation of the user stroke data obtained from the user interface. Responsive to detecting that the second series of data points is within a conformity threshold relative to the assisting geometry, an example embodiment may extend the boundary of the recognized geometry to additionally correspond with the second series of data points. The recognition result is then displayed with the updated recognized geometry through the user interface.

As used herein, "user stroke data" may be a term that refers to user input obtained from user interaction with a sketch device (e.g., a touchscreen). For example, user stroke data may be data used to represent a user's strokes on a sketch device. In some cases, the user stroke data may be represented as series of data points. User stroke data may include multiple segments each having its own subset of data points. Further, each segment of user stroke data may correspond to a primitive geometry. Still further, each data point in a series of data points may include time-based information to determine the sequence in which the data points are entered by a user and may be used to detect pauses or interruptions in time between stroke inputs.

The recognition module provides various methods to recognize user stroke data as a set of primitive geometries. The recognition process may occur in substantially real-time and may be incremental. The recognition module may update the recognized geometry based at least in part on each new data point that is detected.

The recognized geometry of each stroke segment is represented as a bounded primitive geometry (which may refer to as a "recognized geometry"). Based at least in part on the type of geometry corresponding to the recognized geometry, the recognition module may also create an assisting geometry, which is an extended, possibly unbounded version of the recognized geometry. The assisting geometry, in some cases, may be used as visual aid for the user. The relation of assisting geometry being the extended, possibly unbounded version of the recognized geometry may be maintained in the system. When one of them changes (e.g., the recognized geometry), the other (e.g., the assisting geometry) may get synchronized by the recognition module to match geometric properties.

By way of example and not limitation, embodiments providing a recognition result with an assisting geometry can have a number of useful applications. For example, in some cases, example embodiments may use the assisting geometry to assist the user in sketching by providing a guide for continuing with further stroke segments. Additionally or alternatively, example embodiments may use the assisting geometry to determine how an adjustment of a current recognition result needs to be made (e.g., whether a new recognition result needs to be made). Still further, in some cases, example embodiments may use the assisting geometry to determine how new data points may be processed relative to prior data points when an interruption occurs. In other cases, example embodiments may use the assisting geometry to identify users' intent if there is an ambiguous input which may have more than one recognition result.

As discussed above, some embodiments may allow a user to adjust the recognition results. For example, some embodiments may adjust the recognition results by updating the range of recognized geometry while leaving the assisting geometry unchanged. Further, some embodiments may create a new recognized geometry with a new assisting geometry that replaces a prior recognized geometry and assisting geometry for a given segment. Still further, example embodiments may spin off a new segment from the current segment to have its own recognized geometry and assisting geometry.

In the above example embodiments, when a new recognized geometry needs to be created to replace the existing result, the type of new recognized geometry may be dependent on the type of existing recognized geometries. Thus, according to some embodiments, the adjustment of geometry type may be in a fixed order.

As described above, continuous user stroke data can be interrupted for any number of reasons, such as pen being released from touchscreen. After such an interruption, depending on the relative position of the new data points to the current assisting geometry and recognized geometry. Example embodiments may identify the following exemplary scenarios:

The new data points are to continue last series of data points for the previously interrupted user stroke data;
The new data points are to create a new recognized geometry but with an assisting geometry matching previous one; or
The new data points are to start a new recognized geometry and assisting geometry separated from the previously interrupted stroke.

These and other embodiments are described, by way of example, in further detail below.

Platform Architecture

FIG. 1 is a block diagram showing components in a system 100 where a user 102 interacts with a client device 104 configured to process user stroke data, according to an example embodiment. In an example embodiment, the client device 104 may be any suitable computing device (or computing devices), such as a smart phone, a personal digital assistant (PDA), a mobile phone, a personal computer, a laptop, a computing tablet, or any other device suitable for receiving stroke input, processing stroke input, and providing visual display of the stroke input, or combination thereof.

As FIG. 1 shows, the client device 104 includes: 1) a stroke input module 106 to receive user stroke data; 2) recognition module 108 to generate a recognition result based on the user stroke data; and 3) a user interface module 110 to display the recognition result and visual aids.

The processes performed by the stroke input module 106, the recognition module 108, and the user interface module 110 may be performed in substantially real-time. For example, the recognition module 108 may process the input data responsive to detecting the user stroke data, which may, in turn, notify the user interface module 110 about updates to a recognition result caused by the new stoke input data. In this way, the recognition module 108 may provide feedback to users without requiring the user to complete their strokes. Instead, example embodiments may provide users with responsive visual feedback and visual aids about on-going input stroke.

Figure 2:
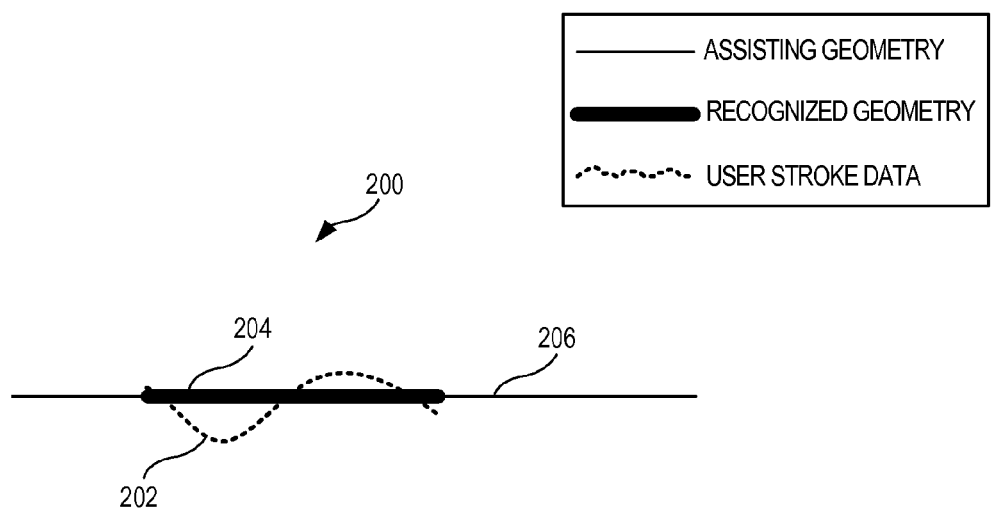
FIG. 2 is a diagram illustrating a user interface for displaying a recognition result, according to an example embodiment.

For clarity of description, the relationship between user generated user stroke data and a recognition result is now described in greater detail. FIG. 2 is a diagram illustrating a user interface 200 for displaying a recognition result, according to an example embodiment. As FIG. 2 illustrates, the user interface 200 may illustrate user stroke data 202 and a recognition result, which is comprised of a recognition geometry 204 and an assisting geometry 206.

The user stroke data 202 may be data representing user stroke data obtained by the stroke input module 106 of FIG. 1. For example, the stroke input module 106 may detect user interaction with a touchscreen that is represented as a series of data points that may optionally include time based information. Such data points, and the time based information, may characterize a user's interaction with the input device (e.g., a touch screen or sketch pad). It is to be appreciated that the user stroke data 202 may be divided into multiple stroke segments, where each segment is represented by a corresponding subset of data points. Accordingly, the user stroke data 202 and its corresponding data points may represent an input to the recognition module 108 of FIG. 1 obtained through, for example, the sketch input module 106 of FIG. 1.

The recognition result (e.g., the recognition geometry 204 and the assisting geometry 206) provides a visual aid to the user as to a geometry that matches the user stroke data. It is to be appreciated that the recognition result is presented (e.g., displayed) to the user prior to the user completing the sketch of the desired geometry. The recognized geometry 204 is a portion of the matching geometry that fits the user stroke data 202. In some cases, the recognized geometry 204 has limited range, its start and end parameters are in accordance with the start point and end point of the user stroke data 202. As shown in FIG. 2, the recognized geometry 204 is the bounded according to the length of the user stroke data 202. In such cases, the recognition module 108 may bound the recognized geometry 204 as a function of the user stroke data 202.

In conjunction with the recognized geometry 204, the assisting geometry 206 is also created as part of the recognition result to provide a visual aid depicting a full range version of the matching geometry. By way of example and not limitation, an unbounded line is an extended, full range version of a bounded line, while a circle may be an extended, full range version of an arc. In some cases, the recognition module 108 may extend the assisting geometry 206 to the boundary of the displayable area of the user interface module 110 of FIG. 1.

Figure 3A:
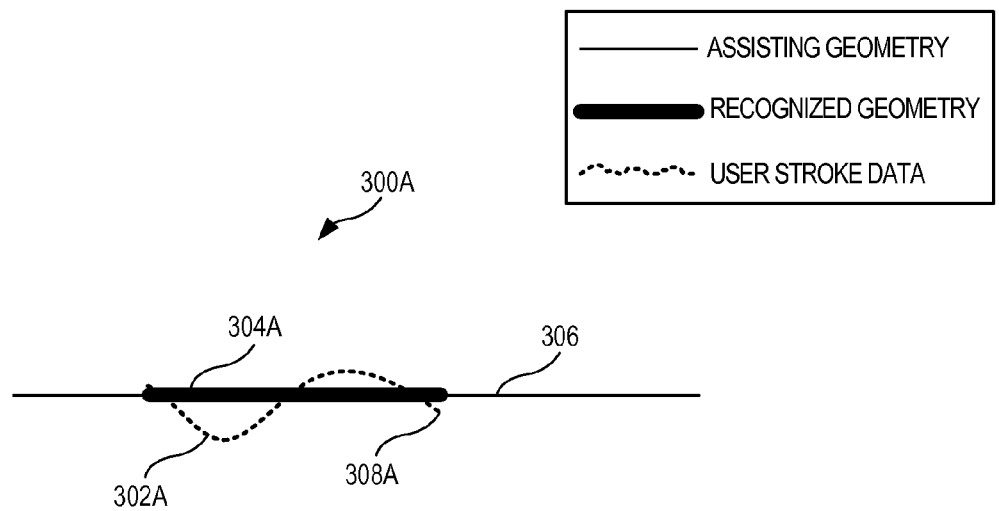
FIGS. 3A-B are diagrams showing how the recognition module may update the recognized geometry of a recognition result, according to an example embodiment.
Figure 3B:
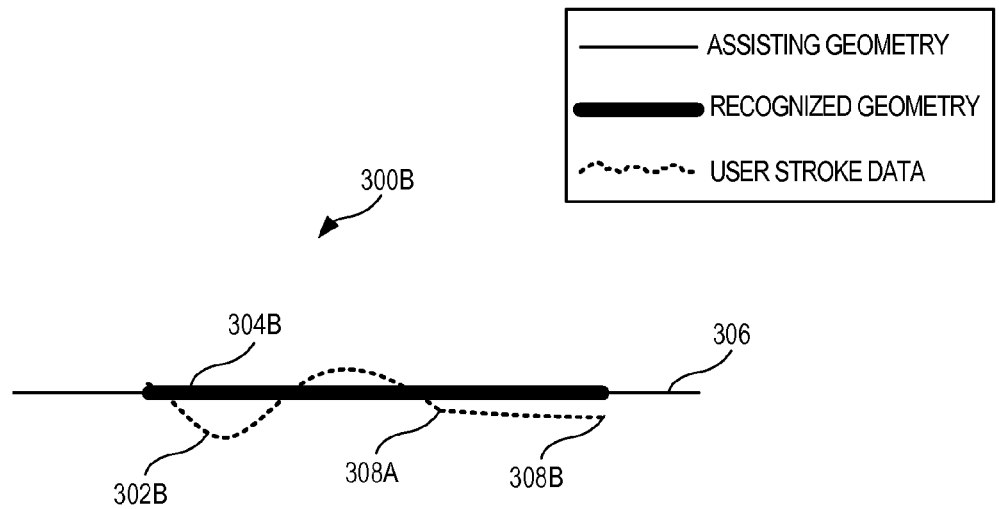

Once the recognition module 108 generates a recognition result (e.g., in the form of a recognized geometry and an assisting geometry), if the recognition result displays a matching geometry that the user intends to draw, the user can choose to trace the assisting geometry and the recognition module 108 may further update the dimensions (e.g., range) of the recognized geometry. FIGS. 3A-B are diagrams showing how the recognition module 108 may update the recognized geometry of a recognition result, according to an example embodiment. For example, FIG. 3A may be a snapshot at one instance of time capturing a user stroke input 302A corresponding to an input from the user and the recognition result (e.g., in the form of a recognized geometry 304A and an assisting geometry 306). It is to be appreciated that the recognized geometry 304A may be bounded by the endpoints of the user stroke input, such as the endpoint 308A.

Relative to FIG. 3A, FIG. 3B is a snapshot taken at a later instance of time capturing an updated user stroke input 302B and an updated recognition result (e.g., in the form of an updated recognized geometry 304B and the assisting geometry 306). The updated stroke input 302B represents a continuation of the stroke input 302A of FIG. 3A such that the new end point 308B now extends beyond the prior end point 308A. The recognition module 108 may generate the updated recognized geometry 304B when new data points of the user stroke data are kept within a conformity threshold of the assisting geometry 306. When the new data points are kept within the conformity threshold of the assisting geometry, the recognition module 108 may determine that the user is tracing the assisting geometry.

As just discussed above, the recognition module 108 may update a recognition result so that the recognized geometry is updated to correspond with the dimensions of the updated user stroke data so long as the continuation of the user stroke data is within a conformity threshold of the assisting geometry. However, if the recognition module 108 detects that subsequent data points deviate from a current assisting geometry beyond the conformity threshold, the recognition module 108 may determine that the current recognition result does not match the geometry that the user is currently drawing or, alternatively, a new geometry needs to be started after current geometry. FIGS. 4A-B and FIGS. 5A-B illustrate two of these use cases in greater detail.

Figure 4A:
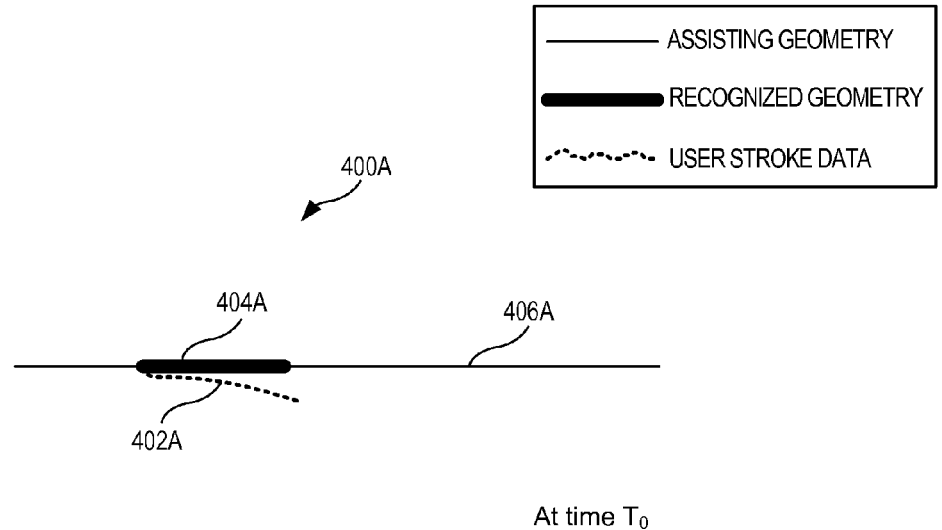
FIGS. 4A-B are diagrams illustrating a scenario of how a recognized geometry is updated after the recognition module detects new data points that deviate from the assisting geometry, according to an example embodiment.
Figure 4B:
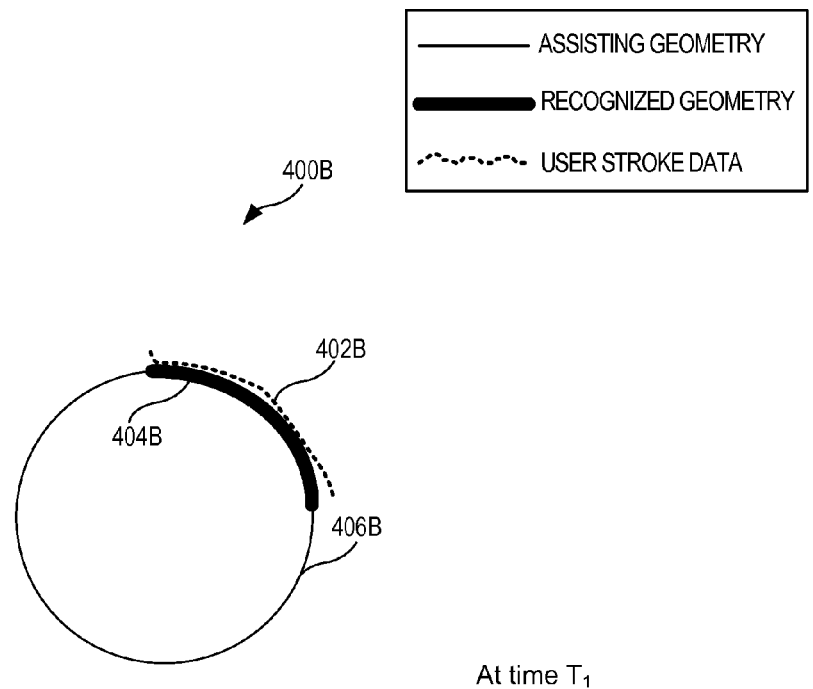

FIGS. 4A-B are diagrams illustrating a scenario of how a recognized geometry is updated after the recognition module 108 detects new data points that deviate from the assisting geometry (e.g., as may be measured by a threshold range), according to an example embodiment. FIG. 4A illustrates a first instance where the recognition result (e.g., in the form of a recognized geometry 404A and an assisting geometry 406A) is generated responsive to the user stroke data 402A. As can be appreciated, the recognition result may correspond to a line geometry.

FIG. 4B illustrates the recognition module 108 updating the recognition result in response to the updated user stroke data 402B deviating from the assisting geometry beyond a threshold range. As FIG. 4B illustrates, the updated user stroke data 402B, which is a continuation of user stroke data 402A, now roughly forming an arc. Accordingly, the recognition module 108 may match the updated user stroke data 402B with a different geometry, such as an arc rather than a line. After matching the updated user stroke data 402B, the recognition module 108 may generate the updated recognition result to include an updated recognized geometry 404B and assisting geometry 406B corresponding to the different geometry. The updated recognized geometry 404B and assisting geometry 406B better fit the data points and subsequently a circle is created as assisting geometry.

When the recognition module 108 generates a new recognition result to replace an existing recognition result, the existing recognition result may be used as a reference to determine a geometry type for the new recognition result. For example, in the scenario illustrated by FIGS. 4A-B, because the existing recognition result (shown in FIG. 4A) corresponded to a line geometry, according to the built-in order of geometry type adjustment, the geometry type of the new recognition result to replace the line may be an arc. Similarly, if existing recognition result was an arc, a recognition result corresponding to an elliptical arc could be created, since that is the new geometry type based on the built-in order. The fixed order ensures the adjustment of recognition results is always predictable.

Figure 5:
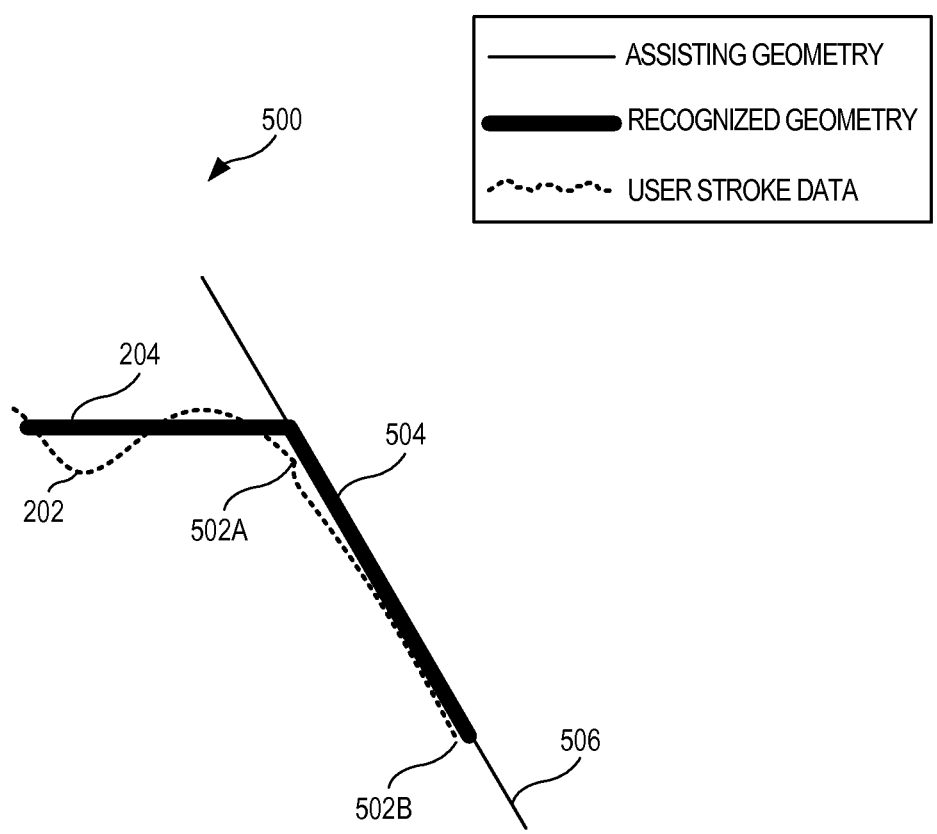
FIG. 5 illustrates an example embodiment that updates an existing recognition result by adding a new recognition result off of the existing recognition result, according to an example embodiment.

FIG. 5 illustrates an example embodiment that updates an existing recognition result by adding a new recognition result off of the existing recognition result, according to an example embodiment. FIG. 5 may be explained with reference to FIG. 2. As may be recalled, FIG. 2 shows a recognition result that includes the recognized geometry 204 and assisting geometry 206 that was generated based on the user stroke data 202. FIG. 5 shows the user stroke data 202 being continued by stroke data points from start point 502A to end point 502B. The data points from the start point 502A to the end point 502B may be referred to as the new data points. While the recognition module 108 detects the new data points, the recognition module 108 may determine that new data points deviate, beyond a conformity threshold, from the assisting geometry 106 shown in FIG. 2. Based on this determination, a new recognition result is spun off from the existing recognized geometry 204. The new recognition result includes a new recognized geometry 504 and a new assisting geometry 506. As shown in FIG. 5, the new recognition result corresponds to a line geometry with the new recognized geometry 504 being a bounded line with dimensions corresponding to the new data point data and the new assisting geometry 506 being an expanded, unbounded line extending the new recognized geometry 504.

Figure 6A:
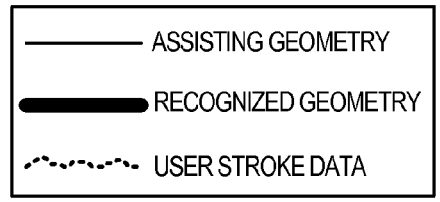
FIGS. 6A-B are diagrams illustrating a scenario where the recognition module updates a recognition result by rotating a recognized geometry and an assisting geometry, according to an example embodiment.
Figure 6A:
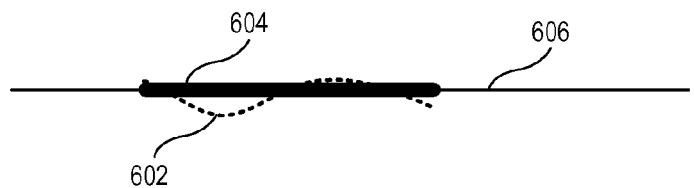
Figure 6B:
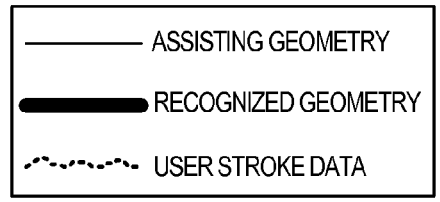
Figure 6B:
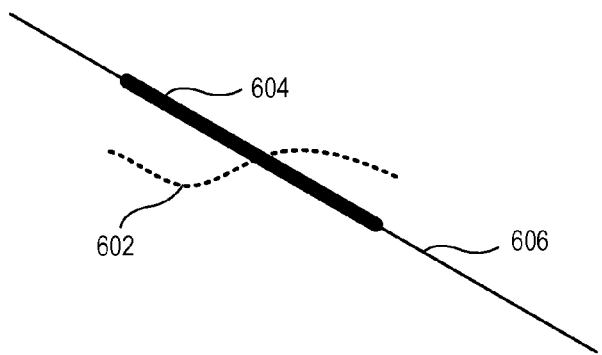

FIGS. 6A-B are diagrams illustrating a scenario where the recognition module 108 updates a recognition result by rotating a recognized geometry 604 and an assisting geometry 606, according to an example embodiment. In the initial state shown in FIG. 6A, the recognized geometry 604 and the assisting geometry 606 are both substantially horizontal in orientation. In the later state shown in FIG. 6B, the recognition module 108 updates the orientation of the recognized geometry 604 to a new direction or angle. Such an update may occur responsive to receiving a request from the user through the user interface. In addition to updating the recognized geometry 604, the recognition module 108 also updates the assisting geometry 606 to match the orientation of the recognized geometry 604 such that the assisting geometry 606 remains the extended, unbounded version of the recognized geometry 604.

Figure 7:
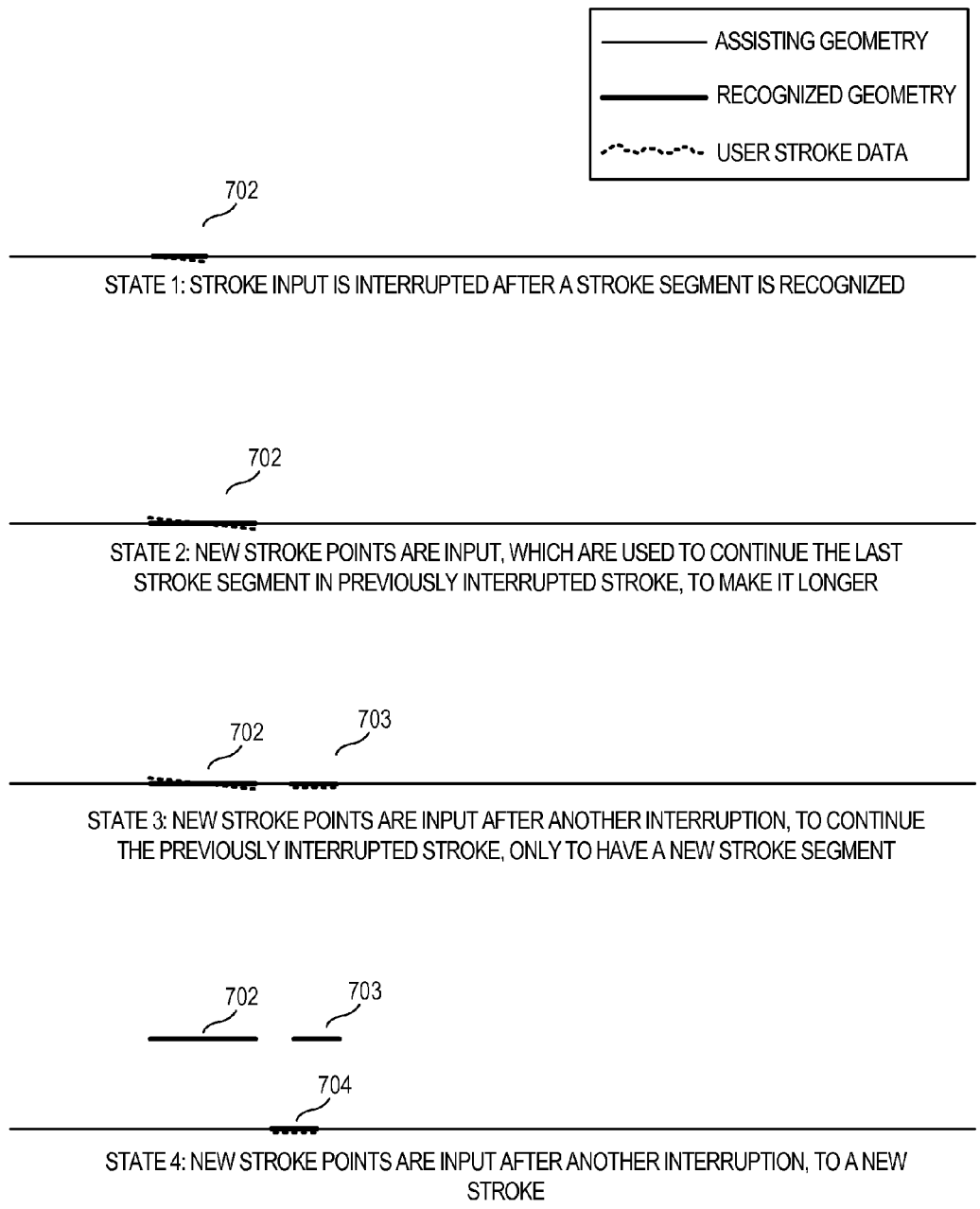
FIG. 7 is a diagram that shows scenarios of the recognition module handling interruptions in obtaining user stroke data, according to an example embodiment.

FIG. 7 is a diagram that shows scenarios of the recognition module 108 handling interruptions in obtaining user stroke data, according to an example embodiment. The State 1 represents a point in time where the recognition module 108 has generated an initial recognition result 702 corresponding to matching user stroke data to a line geometry.

State 2 represents a later point in time where an interruption occurs (e.g., the user stops sketching and then resumes sketching) and then continues the user stroke data off of the original user stroke data. The recognition module 108 may determine that the user is continuing the line geometry matched in State 1 based on the stoke point data being substantially near both the recognized geometry and assisting geometry, as may be measured by a distance threshold. Accordingly, the recognition module 108 continues to associate the new user stroke data with the initial recognition result by extending the recognized geometry to correspond to the dimensions of the user stroke data.

After another interruption, at State 3, the recognition module 108 detects new data points that are substantially on the assisting geometry but beyond a distance threshold from the recognized geometry. In this case, the recognition module 108 may determine that the new data points are to generate a new recognition result that with an assisting geometry that matches the assisting geometry of the initial recognition result. The new recognition result created at State 3 may include a recognized geometry that is separate from the recognized geometry of the initial recognition result.

At the next state (State 4), after yet another interruption, the recognition module 108 detects new data points that are beyond a distance threshold from both the assisting geometry and the recognized geometry of the new recognition result 703. As a result, the recognition module 108 may then generate a recognition result 704 that includes a recognized geometry and assisting geometry that is separate from the recognition results 702 and 703.

Figure 8:
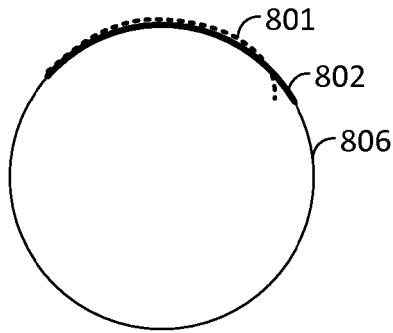
FIG. 8 is a diagram illustrating generating multiple recognition results for ambiguous user stroke data, according to an example embodiment.
Figure 8:
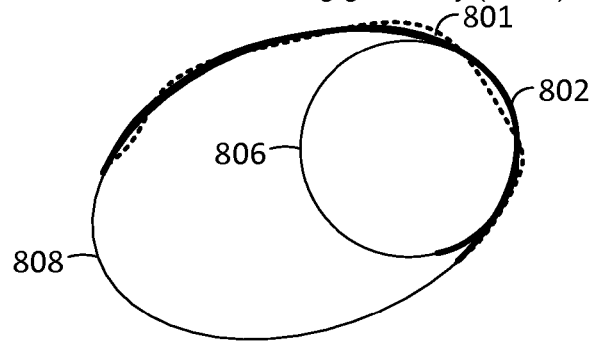
Figure 8:
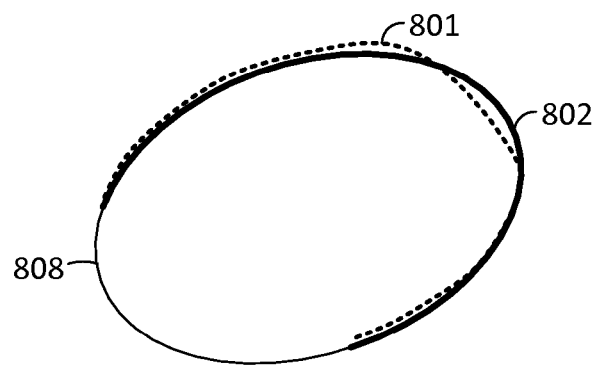

FIG. 8 is a diagram illustrating generating multiple recognition results for ambiguous user stroke data, according to an example embodiment. At the initial state (State 1), the recognition module 108 generates a recognition result based on user stroke data 801 matching an arc geometry, which is highlighted by the recognized geometry 802. As shown in FIG. 8, the recognition module 108 may further generate an assisting geometry 806 corresponding to a circle geometry responsive to matching the user stroke data to an arc geometry. After detecting that new stroke data points deviate from the current assisting geometry (e.g., the assisting geometry 806), the recognition module 108 may select between two possibilities: 1) generating a new recognition result matching an elliptical arc to replace the previous recognized geometry of the current stroke segment; or 2) spinning a new recognition result off from the recognized geometry of the previous recognition result, wherein the recognized geometry may match another arc. These two possibilities are shown in State 2, where the recognition result 810 displays both these options as two different assisting geometries, the assisting geometry of ellipse corresponds to the assisting geometry 808, while the assisting geometry of circle corresponds remains displayed as the assisting geometry 806. Between the two options, users can choose which assisting geometry to trace. In an example embodiment, a user may choose between the options by sketching substantially along with one of the assisting geometries. For example, State 3 shows that the user continues to trace along the assisting geometry representing the ellipse. That is, the user continues to trace substantially close to the ellipse and away from the circle, which means the assisting geometry 808 is chosen, and the ellipse becomes the assisting geometry while the circle is removed.

Figure 9:
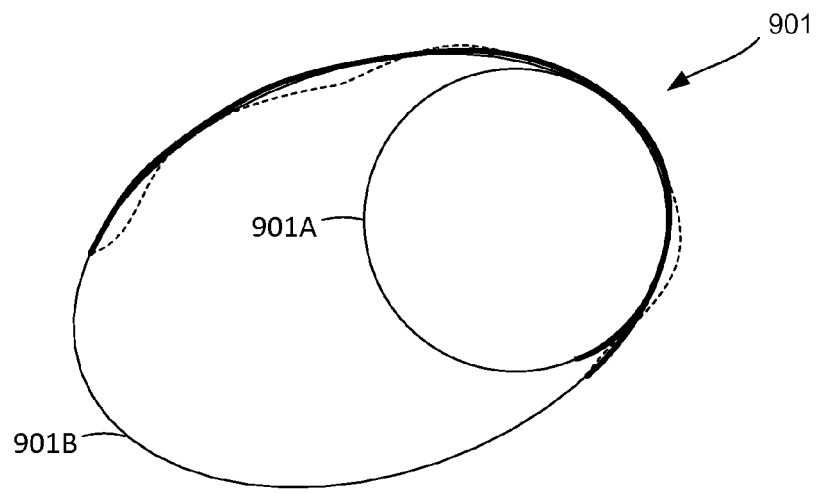
FIG. 9 is a diagram illustrating a scenario of generating multiple assisting geometries for ambiguous input similar to the scenario shown in FIG. 8, according to an example embodiment.
Figure 9:
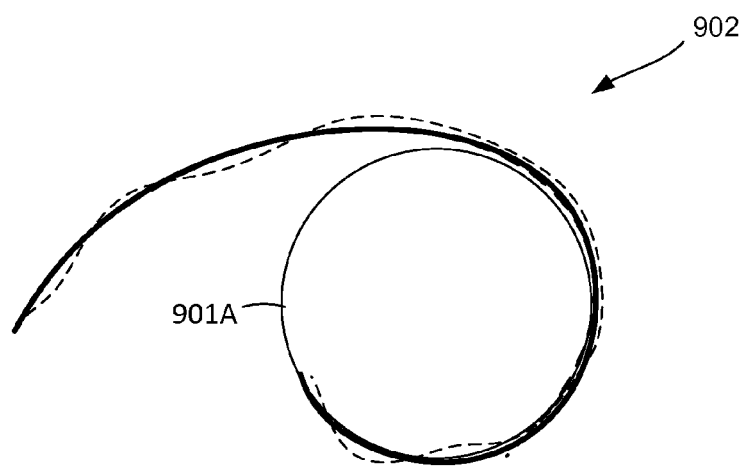

FIG. 9 is a diagram illustrating a scenario of generating multiple assisting geometries for ambiguous input similar to the scenario shown in FIG. 8, according to an example embodiment. In the recognition result 901, two assisting geometries (a circle 901A and an ellipse 901B) are generated. In the recognition result 902, since the subsequent data point data are kept comparatively close to the circle 901A, the recognition module 108 selects, at State 2, the assisting geometry representing a circle 901A as the assisting geometry, to create an arc as recognized geometry for the new spun-off stroke segment.

Figure 10:
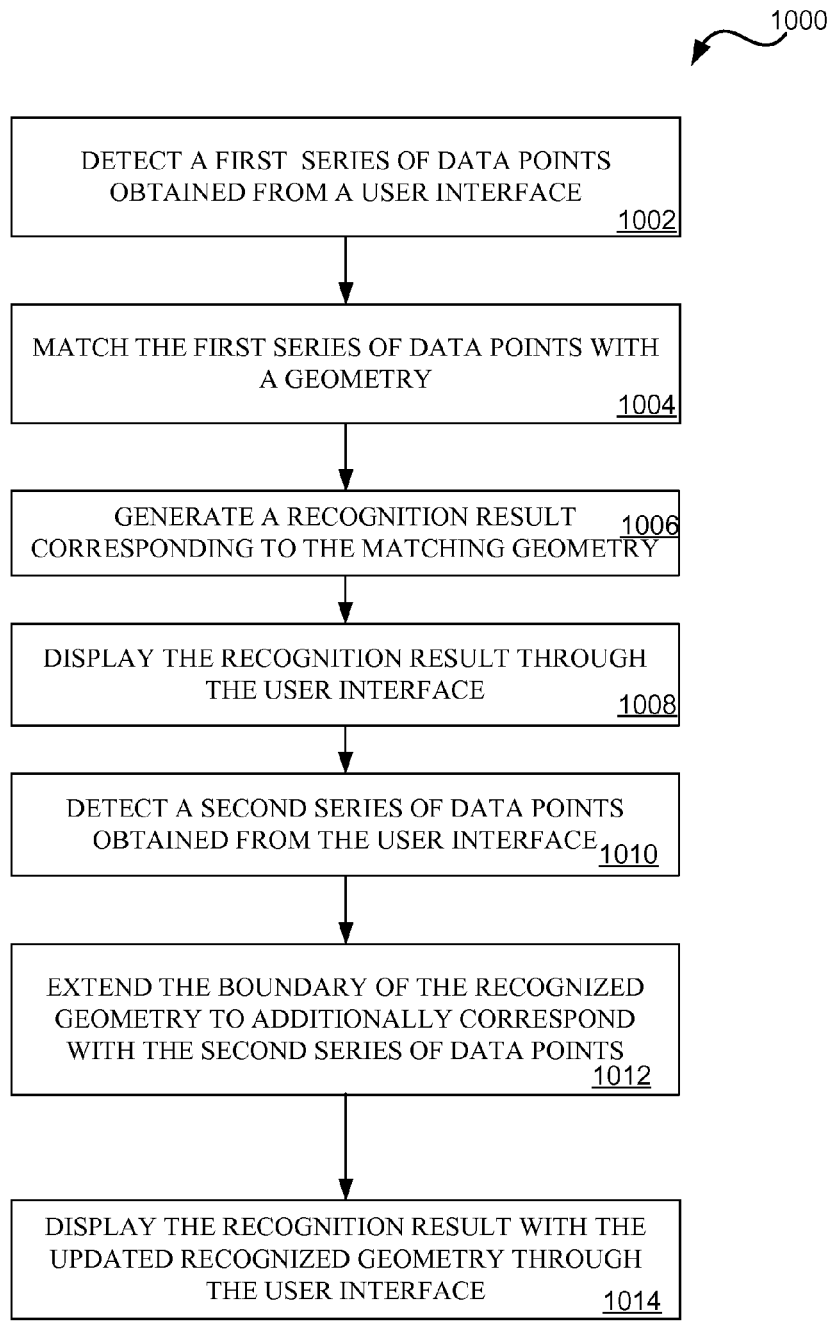
FIG. 10 is a flowchart showing a method of generating a recognition result based on user stroke data, according to an example embodiment.

FIG. 10 is a flowchart showing a method 1000 of generating a recognition result based on user stroke data, according to an example embodiment. According to example embodiments, the method 1000 may be performed by the recognition module 108 and, as such, is described with reference thereto. However, other example embodiments may perform the method 1000 using any of the components or modules described above.

The method 1000 may begin at operation 1002 when the recognition module 108 detects a series of data points obtained from a sketch input module. The series of data points may represent user stroke data obtained from the sketch input module 106 of FIG. 1. For example, a user may use a touch interface to sketch a portion of a drawing, written material, or any other user drawn illustration. In some embodiments, the series of data points are detected at the beginning of a sketch or, in some other embodiments, the series of data points are obtained in the middle of a stroke.

At operation 1004, the recognition module 108 may match the series of data points with a geometry. For example, the recognition module 108 may determine that the series of stroke data points may fit well with a line geometry, an arc geometry, or any other suitable geometric shape.

At operation 1006, the recognition module 108 may generate a recognition result corresponding to the matching geometry. As described above, the recognition result may comprise a recognized geometry and an assisting geometry, where the recognized geometry has a dimension corresponding to the first series of stroke data points. The assisting geometry may be a geometric extension of the recognized geometry. FIG. 3A illustrates an example of a recognition result corresponding to matching user stroke data 302A with a line geometry.

At operation 1008, the recognition module 108 may cause the recognition result to be displayed through the user interface 110.

At operation 1010, the recognition module 108 may detect a new series of stroke data points obtained from the sketch input module 106. The new series of stroke data points may represent a continuation of the user stroke data obtained at operation 1002. For example, with momentary reference to FIG. 3B, the new series of stroke data points may be represented by the continuation of user stroke data from point 308A to 308B.

With reference back to FIG. 10, at operation 1012, responsive to detecting that the new series of data points is within a conformity threshold relative to the assisting geometry, the recognition module 108 may extend the boundary of the recognized geometry to additionally correspond with the new series of data points. This operation is again illustrated with reference to FIG. 3B, where the updated recognized geometry 304B is shown to be extended along the user stroke data 302 and the user stroke data from points 308A to 308B.

At operation 1014 of FIG. 10, the recognition module 108 may display the recognition result with the updated recognized geometry through the user interface.

Figure 11:
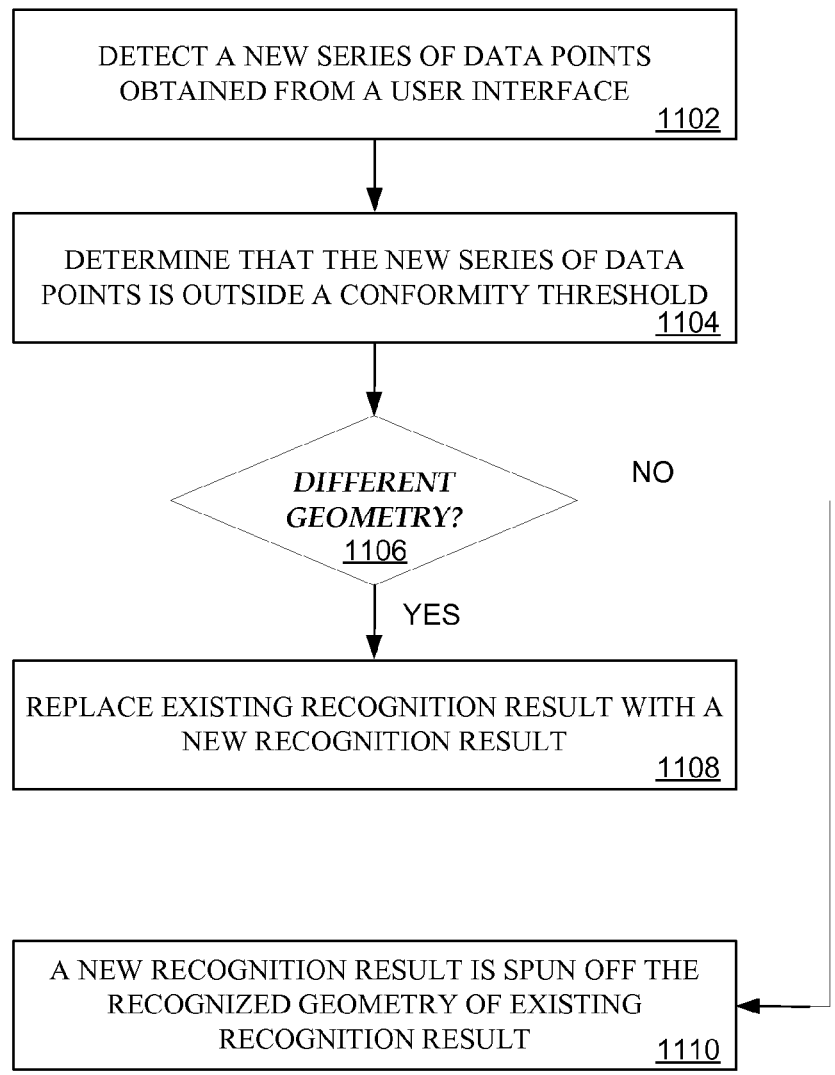
FIG. 11 is a flowchart showing a method of a stroke recognition process, according to an example embodiment.

FIG. 11 is a flowchart showing a method 1100 of a stroke recognition process, according to an example embodiment. According to example embodiments, the method 1100 may be performed by the recognition module 108 and, as such, is described with reference thereto. However, other example embodiments may perform the method 1100 using any of the components or modules described above.

The method 1100 may be performed after the recognition module 108 has generated a recognition result, which, for the purpose of clarity, is referred to herein as an existing recognition result. Accordingly, the method 1100 may be performed, by way of example and not limitation, after operation 1006 or operation 1012 of FIG. 10.

At operation 1102 of FIG. 11, the recognition module 108 detects a new series of data points after generating the existing recognition result. As described above, a recognition result may correspond to matching an existing series of stroke data points to a geometry and, further, may comprise a recognized geometry and an assisting geometry.

At operation 1104, the recognition module 108 may determine that the new series of data points is outside a conformity threshold from the assisting geometry of the existing recognition result. For example, the new series of data points may represent the user drawing an arc which at some point may deviate from an assisting geometry corresponding to a line geometry (See, e.g., FIGS. 4A-B).

Based on the determination made at operation 1104, the recognition module 108 performs a decision 1106. The decision 1106 decides whether the new series of data points along with at least some portion of the existing series of data points better match a geometry that is different from the geometry corresponding to the existing recognition result. For example, where the recognition module 108 initially generates a recognition result corresponding to a line geometry based on the existing series of stroke data points being substantially straight, the recognition module 108 may determine that the existing series of stroke data points in addition to the new series of stroke data points now better match an arc geometry. Accordingly, if such is the case, the recognition module 108 may replace the existing recognition result (e.g., one that corresponds to a line geometry) with a new recognition result (e.g., one that correspond to an arc geometry) (See, e.g., FIGS. 4A-B). Replacing the recognition result is shown as operation 1108 of FIG. 11.

If, instead, the recognition module 108 determines that the existing series of stroke data points and the new series of stroke data points do not match a different geometry, the recognition module 108 may spin a new recognition result off the recognized geometry of the existing recognition result (See, e.g., FIG. 5). This spinning off the new recognition result is shown as operation 1110.

Some embodiments in some situations may but necessarily realize the following advantages:

Comparatively higher recognition rate. Because of the ambiguity of human input, past systems may mistake input strokes for wrong geometries. Such is the case because with the one-time recognition process, users don't get an immediate visual feedback during sketching hence won't be able to make real-time adjustment to correct the result. In comparison, example embodiments described herein may provide relatively immediate visual feedback.

Increased dimension control. In past systems, even if strokes are correctly recognized, the dimensions of the shape are solely determined by the applications and users don't have control over it. This is not the case with some embodiments described herein.

Increased usability. Traditional sketching is an error-prone process, normal users would feel very difficult to complete a sketch without any visual aids, as may be provided by embodiments described herein.

Accordingly, example embodiments may provide the desirable advantages of having a real-time, incremental sketch input and recognition mechanism for comparatively better performance in above areas.

Exemplary Computer Systems

Figure 12:
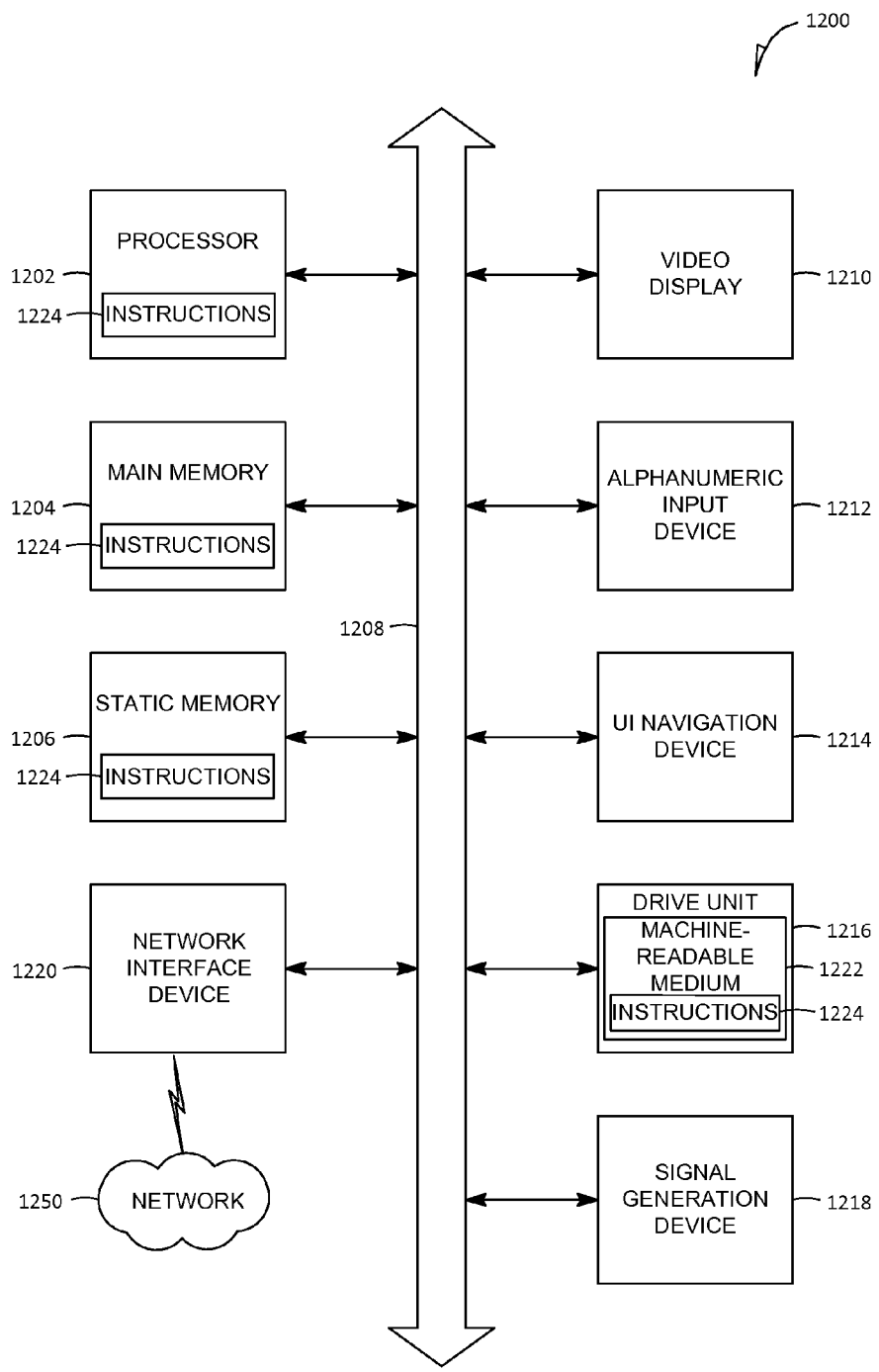
FIG. 12 is a block diagram illustrating an example computing system architecture, which may be used to implement one or more of the methodologies described herein, according to some embodiments.

FIG. 12 shows a diagrammatic representation of machine in the example form of a computer system 1200 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a disk drive unit 1216, a signal generation device 1218 (e.g., a speaker) and a network interface device 1220.

The disk drive unit 1216 includes a machine-readable medium 1222 on which is stored one or more sets of instructions and data structures (e.g., software 1224) embodying or utilized by any one or more of the methodologies or functions described herein. The software 1224 may also reside, completely or at least partially, within the main memory 1204 and/or within the processor 1202 during execution thereof by the computer system 1200, the main memory 1204 and the processor 1202 also constituting machine-readable media.

The software 1224 may further be transmitted or received over a network 1226 via the network interface device 1220 utilizing any one of a number of well-known transfer protocols (e.g., HTTP).

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

What is claimed is:

1. A computer-implemented method comprising:
    detecting a first series of data points obtained from a sketch input module, the first series of data points representing user stroke data obtained from the sketch input module;
    matching the first series of data points with a geometry;
    generating a recognition result corresponding to the matching geometry, the recognition result comprising a recognized geometry and an assisting geometry, the recognized geometry having a boundary corresponding to the first series of data points and the assisting geometry being a geometric extension of the recognized geometry;
    simultaneously displaying the first series of data points and the recognition result through a user interface;
    detecting a second series of data points obtained from the sketch input module, the second series of data points representing a continuation of the user stroke data obtained from the sketch input module;
    responsive to detecting the second series of data points, updating the recognized geometry based on a deviation of the second series of data points from the assisting geometry; and
    simultaneously displaying the second series of data points and the recognition result with the updated recognized geometry through the user interface.

2. The method of claim 1, further comprising:
    detecting a third series of data points obtained from the sketch input module, the third series of data points representing a further continuation of the user stroke data obtained from the sketch input module;

responsive to detecting that the third series of data points is outside a conformity threshold relative to the assisting geometry, matching the first series of data points, the second series of data points, and the third series of data points with a different geometry;

updating the recognition result to correspond to the different geometry, the updating including updating the recognized geometry to fit the first series of data points, the second series of data points, and the third series of data points, and the updating further including updating the assisting geometry to extend the updated recognized geometry; and displaying the updated recognition result.

3. The method of claim 1, further comprising:

detecting a third series of data points obtained from the sketch input module, the third series of data points representing a further continuation of the user stroke data obtained from the sketch input module;

responsive to detecting that the third series of data points is outside a conformity threshold relative to the assisting geometry, splitting the first series of data points, the second series of data points, and the third series of data points into a first segment and second segment;

matching the second segment with a different geometry;

generating an additional recognition result to correspond to the different geometry, the additional recognition result including a recognized geometry corresponding to the second segment, and an assisting geometry; and displaying the additional recognition result as a continuation of the recognition result.

4. The method of claim 1, further comprising:

matching the first and second series of data points with an additional geometry;

generating an additional recognition result corresponding to the additional matching geometry, the additional recognition result comprising a recognized geometry and an assisting geometry, the recognized geometry of the additional recognition result having a boundary corresponding to the first series of data points and the second series of data points, the assisting geometry of the additional recognition result being a geometric extension of the recognized portion of the additional recognition result; and displaying the additional recognition result through the user interface in conjunction with the recognition result.

5. The method of claim 4, further comprising, responsive to detecting a user selection of the recognition result, ceasing to display the additional recognition result.

6. The method of claim 4, further comprising:

detecting a third series of data points; and responsive to detecting that the third series of data points is outside a conformity threshold relative to the assisting geometry of the additional recognition result, ceasing to display the additional recognition result.

7. The method of claim 1, further comprising:

detecting an interruption in the user stroke data;

after detecting the interruption, detecting a new series of data points obtained from the sketch input module, the new series of data points representing a further continuation of the user stroke data obtained from the sketch input module; and responsive to detecting that the new series of data points is within a conformity threshold relative to the recognized geometry, extending the boundary of the previous recognized geometry to additionally correspond with the second series of data points.

8. The method of claim 1, further comprising:

detecting an interruption in the user stroke data;

after detecting the interruption, detecting a new series of data points obtained from the sketch input module, the new series of data points representing a further continuation of the user stroke data obtained from the sketch input module; and responsive to detecting that the new series of data points is within a conformity threshold relative to the assisting geometry and outside a conformity threshold relative to the recognized geometry, generating a new recognition result, the new recognition result including a recognized geometry having a boundary corresponding to the new series of data points, and the updated recognition result further including an assisting geometry matching the assisting geometry of the recognition result.

9. The method of claim 1, further comprising:

detecting an interruption in the stroke data after an recognition result is identified;

after detecting the interruption, detecting a new series of data points obtained from the sketch input module, the new series of data points representing a further continuation of the user stroke data obtained from the sketch input module; and responsive to detecting that the new series of data points is outside a conformity threshold relative to the assisting geometry, generating a new recognition result, the new recognition result including a recognized geometry having a boundary corresponding to the new series of data points, and the new recognition result further including an assisting geometry being a geometric extension of the recognized geometry of the new recognition result.

10. The method of claim 1, further comprising detecting a user initiated request to update a geometric property of the recognition result, updating the recognized geometry and assisting geometry according to the updated geometric property.

11. The method of claim 10, further comprising:

after updating the recognized geometry and the assisting geometry, detecting a new series of data points obtained from the sketch input module, the new series of data points representing a continuation of the user stroke data obtained from the sketch input module;

responsive to detecting that the new series of data points is within a conformity threshold relative to the recognized geometry of the recognition result, further extending the boundary of the updated recognized geometry to additionally correspond with the new series of data points; and displaying the recognition result with the further updated recognized geometry through the user interface.

12. The method of claim 1, wherein updating the recognized geometry comprises responsive to detecting that the second series of data points is within a conformity threshold relative to the assisting geometry, extending the boundary of the recognized geometry to additionally correspond with the second series of data points.

13. A computer system comprising:

a recognition module implemented by one or more processors and configured to:

detect a first series of data points obtained from a sketch input module, the first series of data points representing user stroke data obtained from the sketch input module;

match the first series of data points with a geometry;

generate a recognition result corresponding to the matching geometry, the recognition result comprising a recognized geometry and an assisting geometry, the recognized geometry having a boundary corresponding to the first series of data points and the assisting geometry being a geometric extension of the recognized geometry;

simultaneously display the first series of data points and the recognition result through a user interface;

detect a second series of data points obtained from the sketch input module, the second series of data points representing a continuation of the user stroke data obtained from the sketch input module;

responsive to detecting the second series of data points, update the recognized geometry based on a deviation of the second series of data points from the assisting geometry; and simultaneously display the second series of data points and the recognition result with the updated recognized geometry through the user interface.

14. The computer system of claim 13, wherein the recognition module is further configured to:

detect a third series of data points obtained from the sketch input module, the third series of data points representing a further continuation of the user stroke data obtained from the sketch input module;

responsive to detecting that the third series of data points is outside a conformity threshold relative to the assisting geometry, match the first series of data points, the second series of data points, and the third series of data points with a different geometry;

update the recognition result to correspond to the different geometry, the updating including updating the recognized geometry to fit the first series of data points, the second series of data points, and the third series of data points, and the updating further including updating the assisting geometry to extend the updated recognized geometry; and display the updated recognition result.

15. The computer system of claim 13, further comprising:

detecting a third series of data points obtained from the sketch input module, the third series of data points representing a further continuation of the user stroke data obtained from the sketch input module;

responsive to detecting that the third series of data points is outside a conformity threshold relative to the assisting geometry, splitting the first series of data points, the second series of data points, and the third series of data points into a first segment and second segment;

matching the second segment with a different geometry;

generating an additional recognition result to correspond to the different geometry, the additional recognition result including a recognized geometry corresponding to the second segment, and an assisting geometry; and displaying the additional recognition result as a continuation of the recognition result.

16. The computer system of claim 13, further comprising:

matching the first and second series of data points with an additional geometry;

generating an additional recognition result corresponding to the additional matching geometry, the additional recognition result comprising a recognized geometry and an assisting geometry, the recognized geometry of the additional recognition result having a boundary corresponding to the first series of data points and the second series of data points, and the assisting geometry of the additional recognition result being a geometric extension of the recognized portion of the additional recognition result; and displaying the additional recognition result through the user interface in conjunction with the recognition result.

17. The computer system of claim 16, further comprising, responsive to detecting a user selection of the recognition result, ceasing to display the additional recognition result.

18. The computer system of claim 16, further comprising:

detecting a third series of data points; and responsive to detecting that the third series of data points is outside a conformity threshold relative to the assisting geometry of the additional recognition result, ceasing to display the additional recognition result.

19. The computer system of claim 13, further comprising:

detecting an interruption in the user stroke data;

after detecting the interruption, detecting a new series of data points obtained from the sketch input module, the new series of data points representing a further continuation of the user stroke data obtained from the sketch input module; and responsive to detecting that the new series of data points is within a conformity threshold relative to the recognized geometry, extending the boundary of the previous recognized geometry to additionally correspond with the second series of data points.

20. The computer system of claim 13, further comprising:

detecting an interruption in the user stroke data;

after detecting the interruption, detecting a new series of data points obtained from the sketch input module, the new series of data points representing a further continuation of the user stroke data obtained from the sketch input module; and responsive to detecting that the new series of data points is within a conformity threshold relative to the assisting geometry and outside a conformity threshold relative to the recognized geometry, generating a new recognition result, the new recognition result including a recognized geometry having a boundary corresponding to the new series of data points, and the updated recognition result further including an assisting geometry matching the assisting geometry of the recognition result.

21. The computer system of claim 13, further comprising:

detecting an interruption in the stroke data after an recognition result is identified;

after detecting the interruption, detecting a new series of data points obtained from the sketch input module, the new series of data points representing a further continuation of the user stroke data obtained from the sketch input module; and responsive to detecting that the new series of data points is outside a conformity threshold relative to the assisting geometry, generating a new recognition result, the new recognition result including a recognized geometry having a boundary corresponding to the new series of data points, and the new recognition result further including an assisting geometry being a geometric extension of the recognized geometry of the new recognition result.

22. The computer system of claim 13, further comprising detecting a user initiated request to update a geometric property of the recognition result, updating the recognized geometry and assisting geometry according to the updated geometric property.

23. The computer system of claim 13, further comprising:

after updating the recognized geometry and the assisting geometry, detecting a new series of data points obtained from the sketch input module, the new series of data points representing a continuation of the user stroke data obtained from the sketch input module;

responsive to detecting that the new series of data points is within a conformity threshold relative to the recognized geometry of the recognition result, further extending the boundary of the updated recognized geometry to additionally correspond with the new series of data points; and displaying the recognition result with the further updated recognized geometry through the user interface.

24. A non-transitory computer-readable storage medium storing instructions for causing a processor to implement operations, the operations comprising:

detecting a first series of data points obtained from a sketch input module, the first series of data points representing user stroke data obtained from the sketch input module;

matching the first series of data points with a geometry;

generating a recognition result corresponding to the matching geometry, the recognition result comprising a recognized geometry and an assisting geometry, the recognized geometry having a boundary corresponding to the first series of data points and the assisting geometry being a geometric extension of the recognized geometry;

simultaneously displaying the first series of data points and the recognition result through a user interface;

detecting a second series of data points obtained from the sketch input module, the second series of data points representing a continuation of the user stroke data obtained from the sketch input module;

responsive to detecting the second series of data points, updating the recognized geometry based on a deviation of the second series of data points from the assisting geometry; and simultaneously displaying the second series of data points and the recognition result with the updated recognized geometry through the user interface.

* * * * *